(12) United States Patent
Xu (10) Patent No.: US 12,382,161 B2
(45) Date of Patent: Aug. 5, 2025

(54) CONFIGURATION METHOD AND APPARATUS

(71) Applicant: Shenzhen Yinwang Intelligent Technologies Co., Ltd., Guangdong (CN)

(72) Inventor: Yongtong Xu, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 226 days.

(21) Appl. No.: 18/341,483

(22) Filed: Jun. 26, 2023

(65) Prior Publication Data

US 2023/0336861 A1 Oct. 19, 2023

Related U.S. Application Data

(63) Continuation of application No. PCT/CN2021/131820, filed on Nov. 19, 2021.

(30) Foreign Application Priority Data

Dec. 25, 2020 (CN) .......................... 202011565909.3

(51) Int. Cl.
  *H04N 23/617* (2023.01)
(52) U.S. Cl.
  CPC ................. *H04N 23/617* (2023.01)
(58) Field of Classification Search
  CPC .............. B60R 11/0264; H04N 23/617; H04L 41/0809; G06F 9/4411; G06F 8/61
  See application file for complete search history.

(56) References Cited

U.S. PATENT DOCUMENTS

| | | | | |
|---|---|---|---|---|
| 2017/0339375 A1* | 11/2017 | Sychta | ...................... | B60R 1/26 |
| 2019/0250611 A1* | 8/2019 | Costin | .................. | G05D 1/0242 |
| 2019/0386630 A1* | 12/2019 | Higuchi | ................... | H03H 7/09 |
| 2020/0039448 A1* | 2/2020 | Lu | ............................ | H04N 7/18 |
| 2023/0026986 A1* | 1/2023 | Jeong | ..................... | H04N 23/66 |
| 2023/0128827 A1* | 4/2023 | Inoue | ........................ | B60R 1/22 |
| | | | | 348/148 |
| 2023/0214231 A1* | 7/2023 | Yuan | ....................... | G06F 8/443 |
| | | | | 713/1 |

FOREIGN PATENT DOCUMENTS

| | | | |
|---|---|---|---|
| JP | 2006339755 A | | 12/2006 |
| JP | 2007329645 A | | 12/2007 |

* cited by examiner

*Primary Examiner* — Frank Johnson
(74) *Attorney, Agent, or Firm* — Leydig, Voit & Mayer, Ltd.

(57) ABSTRACT

The present disclosure relates to a configuration method and apparatus. An image processing device obtains an access configuration file from an image obtaining device, obtains a serializer configuration file and a deserializer configuration file based on the access configuration file, sends the serializer configuration file to the image obtaining device, and the serializer configuration file is used to configure a serializer that is in the image obtaining device, so as to enable the image obtaining device to convert an obtained parallel electrical signal into a serial electrical signal for transmission, and configures a deserializer that is in the image processing device by using the deserializer configuration file, to process a serial electrical signal that is from the image obtaining device, so as to obtain a parallel electrical signal that can be displayed on an image signal processing ISP chip.

20 Claims, 7 Drawing Sheets

CONFIGURATION METHOD AND APPARATUS

CROSS-REFERENCE TO RELATED APPLICATIONS

This application is a continuation of International Patent Application No. PCT/CN2021/131820, filed on Nov. 19, 2021, which claims priority to Chinese Patent Application No. 202011565909.3, filed on Dec. 25, 2020. The disclosures of the aforementioned applications are hereby incorporated by reference in their entireties.

TECHNICAL FIELD

Embodiments of the present disclosure relate to the field of image processing, and in particular, to a configuration method and apparatus.

BACKGROUND

Autonomous driving relies on camera modules. The camera module can be used in lane deviation warning, traffic sign identification, panoramic parking, and the like. With the development of autonomous driving technologies, computing power of autonomous driving chips is increasingly high, a level of autonomous driving is gradually increased, and a quantity of vehicle-mounted cameras in a vehicle is also increasing. For example, in some cases, there may be 15 vehicle-mounted cameras.

An autonomous driving platform needs to adapt to camera modules of different manufacturers to implement autonomous driving. Currently, when a camera module accesses the autonomous driving platform, a configuration file of the currently accessed camera module needs to be manually configured. In this way, when a camera module is replaced or a new camera module is introduced, adaptation of the camera module needs to be performed again, which causes inconvenience.

SUMMARY

In view of this, a configuration method and apparatus are provided, which can implement plug and play of an image obtaining device on an image processing device.

According to a first aspect, an embodiment of the present disclosure provides a configuration method. The method is applied to an image processing device, and the method includes: obtaining an access configuration file from an image obtaining device when it is detected that the image obtaining device accesses the image processing device; obtaining a serializer configuration file and a deserializer configuration file based on the access configuration file; sending a first configuration instruction to the image obtaining device, where the first configuration instruction includes the serializer configuration file, and the serializer configuration file is used to configure a serializer that is in the image obtaining device, so as to enable the image obtaining device to convert an obtained parallel electrical signal into a serial electrical signal for transmission; and configuring a deserializer that is in the image processing device by using the deserializer configuration file, to process a serial electrical signal that is from the image obtaining device, so as to obtain a parallel electrical signal that can be displayed on an image signal processing ISP chip.

In this embodiment of the present disclosure, when a new image input device accesses the image processing device, the image processing device may read and parse information stored in a memory medium of the new image input device, to obtain a serializer configuration file and a deserializer configuration file, so that adaptation of the image input device is automatically implemented, and a user does not need to manually modify configuration information in the image processing device. In other words, in this embodiment of the present disclosure, when a new image input device is introduced to the image processing device, the image processing device is insensible to the image input device. Plug and play of the new image input device can be implemented, and compatibility is implemented for different image input devices, so that development efficiency is improved and development costs are reduced.

According to the first aspect, in a first possible implementation of the configuration method, the obtaining a serializer configuration file based on the access configuration file includes: obtaining the serializer configuration file based on format information for image transmission, information of an address mapping register of a transmission bus, and rate information for image transmission that are in the access configuration file.

In this way, configuration of the serializer can be implemented by generating the serializer configuration file.

According to the first aspect, in a second possible implementation of the configuration method, the obtaining a deserializer configuration file based on the access configuration file includes: obtaining the deserializer configuration file based on an initial configuration file of the deserializer that is preconfigured locally, and transmission channel information, a synchronization pin number, the rate information for image transmission, and the format information for image transmission that are in the access configuration file.

In this way, configuration of the deserializer can be implemented by generating the deserializer configuration file.

According to the first aspect or any one of the foregoing possible implementations of the first aspect, in a third possible implementation of the configuration method, the image obtaining device has a storage medium, and the access configuration file is stored in the storage medium.

In this way, the access configuration information is stored in the storage medium of the image obtaining device, so that when the image obtaining device accesses the image processing device, the image processing device can automatically adapt to the image obtaining device, and a configuration file does not need to be manually added to the image processing device, which is advantageous to improve development efficiency and reduce development costs.

According to the third possible implementation of the first aspect, in a fourth possible implementation of the configuration method, the storage medium further stores an image sensor reset pin number. The method further includes: obtaining the image sensor reset pin number from the image obtaining device; and sending a reset instruction to the image obtaining device, where the reset instruction includes the image sensor reset pin number, so as to enable an image sensor in the image obtaining device to perform a reset operation.

In this way, automatic reset of the image sensor can be implemented.

According to the third possible implementation of the first aspect, in a fifth possible implementation of the configuration method, the storage medium further stores an image sensor configuration file. The method further includes: obtaining the image sensor configuration file from the image obtaining device; and sending a second configuration instruction to the image obtaining device, where the second configuration instruction includes the image sensor configuration file, to configure an image sensor in the image obtaining device.

In this way, automatic configuration of the image sensor can be implemented.

According to the third possible implementation of the first aspect, in a sixth possible implementation of the configuration method, the storage medium further stores a display effect parameter. The method further includes: obtaining the display effect parameter from the image obtaining device; and performing an image display effect adjustment on the ISP chip based on the display effect parameter.

In this way, adaptation between different lenses and the image obtaining device of the image sensor can be implemented, to effectively improving an image display effect.

According to a second aspect, an embodiment of the present disclosure provides a configuration apparatus, and the apparatus is applied to an image processing device. The apparatus includes: a first obtaining module, configured to obtain an access configuration file from an image obtaining device when it is detected that the image obtaining device accesses the image processing device; a parsing module, configured to obtain a serializer configuration file and a deserializer configuration file based on the access configuration file obtained by the first obtaining module; a first sending module, configured to send a first configuration instruction to the image obtaining device, where the first configuration instruction includes the serializer configuration file obtained by the parsing module, and the serializer configuration file is used to configure a serializer that is in the image obtaining device, so as to enable the image obtaining device to convert an obtained parallel electrical signal into a serial electrical signal for transmission; and a configuration module, configured to configure a deserializer that is in the image processing device by using the deserializer configuration file obtained by the parsing module, to process a serial electrical signal that is from the image obtaining device, so as to obtain a parallel electrical signal that can be displayed on an image signal processing ISP chip.

According to the second aspect, in a first possible implementation of the configuration apparatus, the parsing module includes: a first parsing unit, configured to obtain the serializer configuration file based on format information for image transmission, information of an address mapping register of a transmission bus, and rate information for image transmission that are in the access configuration file.

According to the second aspect, in a second possible implementation of the configuration apparatus, the parsing module further includes: a second parsing unit, configured to obtain the deserializer configuration file based on an initial configuration file of the deserializer that is preconfigured locally, and transmission channel information, a synchronization pin number, the rate information for image transmission, and the format information for image transmission that are in the access configuration file.

According to the second aspect or any one of the foregoing possible implementations of the second aspect, in a third possible implementation of the configuration apparatus, the image obtaining device has a storage medium, and the access configuration file is stored in the storage medium.

According to the third possible implementation of the second aspect, in a fourth possible implementation of the configuration apparatus, the storage medium further stores an image sensor reset pin number. The apparatus further includes: a second obtaining module, configured to obtain the image sensor reset pin number from the image obtaining device; and a second sending module, configured to send a reset instruction to the image obtaining device, where the reset instruction includes the image sensor reset pin number, so as to enable an image sensor in the image obtaining device to perform a reset operation.

According to the third possible implementation of the second aspect, in a fifth possible implementation of the configuration apparatus, the storage medium further stores an image sensor configuration file. The apparatus further includes: a third obtaining module, configured to obtain the image sensor configuration file from the image obtaining device; and a third sending module, configured to send a second configuration instruction to the image obtaining device, where the second configuration instruction includes the image sensor configuration file, to configure an image sensor in the image obtaining device.

According to the third possible implementation of the second aspect, in a sixth possible implementation of the configuration apparatus, the storage medium further stores a display effect parameter. The apparatus further includes: a fourth obtaining module, configured to obtain the display effect parameter from the image obtaining device; and an adjustment module, configured to perform an image display effect adjustment on the ISP chip based on the display effect parameter.

According to a third aspect, an embodiment of the present disclosure provides an electronic device. The electronic device may perform the configuration method according to one or more of the first aspect or a plurality of possible implementations of the first aspect.

According to a fourth aspect, an embodiment of the present disclosure provides a computer program product. The computer program product includes computer-readable code or a non-volatile computer-readable storage medium carrying the computer-readable code. When the computer-readable code runs in an electronic device, a processor in the electronic device performs the configuration method according to one or more of the first aspect or the possible implementations of the first aspect.

These or other aspects of the present disclosure are more concise and easier to understand in descriptions in the following (a plurality of) embodiments.

BRIEF DESCRIPTION OF DRAWINGS

The accompanying drawings included in this specification and constituting a part of this specification and this specification jointly show example embodiments, features, and aspects of the present disclosure, and are intended to explain the principles of the present disclosure.

DESCRIPTION OF EMBODIMENTS

The following describes various example embodiments, features, and aspects of the present disclosure in detail with reference to the accompanying drawings. Identical reference signs in the accompanying drawings indicate elements that have same or similar functions. Although various aspects of embodiments are shown in the accompanying drawings, unless otherwise specified, the accompanying drawings do not need to be drawn to scale.

The specific term "example" herein means "used as an example, embodiment or illustration". Any embodiment described as an "example" is not necessarily explained as being superior or better than other embodiments.

In addition, to better describe the present disclosure, numerous specific details are given in the following specific implementations. A person of ordinary skill in the art should understand that the present disclosure may also be implemented without the specific details. In some embodiments, methods, means, elements and circuits that are well-known to a person skilled in the art are not described in detail, so that the subject matter of the present disclosure is highlighted.

In embodiments of the present disclosure, an image obtaining device may represent a device configured to obtain an image, and an image processing device may represent a device configured to process an image. In a possible implementation, the image obtaining device may include a camera module, and the image processing device may include an autonomous driving platform. In this case, according to the configuration method provided in embodiments of the present disclosure, the autonomous driving platform may automatically adapt to camera modules of different manufacturers and different models, so that the autonomous driving platform implements plug and play on the camera module. In a possible implementation, the image obtaining device may include a terminal device such as a mobile phone, a netbook, a tablet computer, a notebook computer, a wearable electronic device (for example, a smart band, a smart watch, or the like), a TV, and a virtual reality device. The image processing device may include a vehicle-mounted display screen, such as a vehicle-mounted display screen connected to an in-vehicle infotainment. In this case, according to the configuration method provided in the embodiments of the present disclosure, the vehicle-mounted display screen may automatically adapt to terminal devices of different manufacturers and different models, and the vehicle-mounted display screen can implement plug and play on the terminal device.

Figure 1:
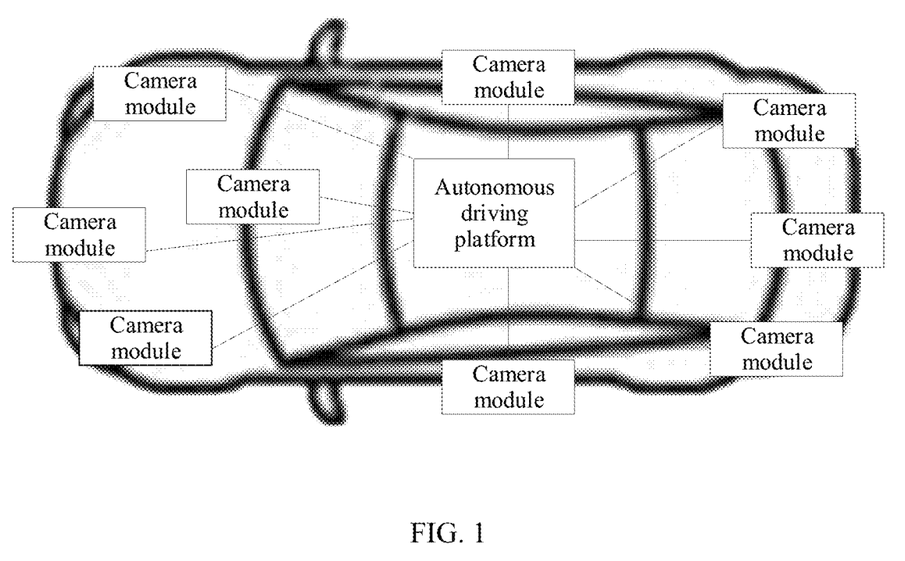
FIG. 1 is a diagram of an implementation environment of a device connection method according to an embodiment of the present disclosure.

For example, the camera module is used as the image obtaining device, and the autonomous driving platform is used as the image processing device. FIG. 1 is a diagram of an implementation environment of a configuration method according to an embodiment of the present disclosure. As shown in FIG. 1, the implementation environment includes camera modules and an autonomous driving platform. The camera modules may be deployed around a vehicle. The autonomous driving platform may be deployed at a location such as a driving position of the vehicle and a central control region. The camera modules may access the autonomous driving platform through coaxial cables or the like. The camera module may obtain an image, and then transmit the obtained image to the autonomous driving platform for processing and displaying.

Figure 2:
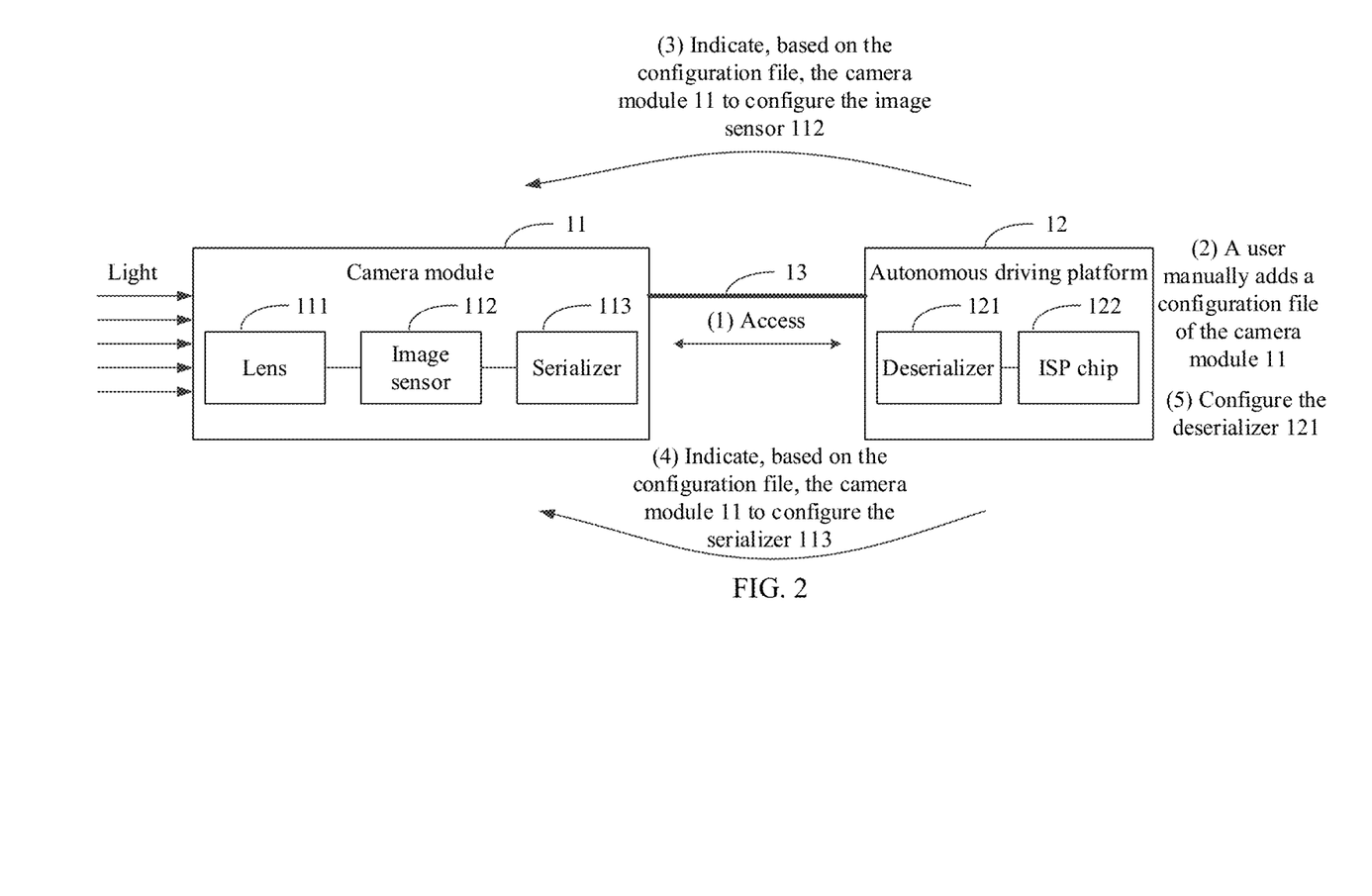
FIG. 2 is a schematic diagram of an architecture of a device connection system in a related technology.

FIG. 2 is a schematic diagram of an architecture of a device connection system in a related technology. As shown in FIG. 2, the system includes a camera module 11, an autonomous driving platform 12, and a coaxial cable 13 that connects the camera module and the autonomous driving platform. The camera module 11 includes a lens 111, an image sensor 112, and a serializer 113. In an example, the lens 111 may include a long-focus lens, a short-focus lens, a medium-focus lens, a fisheye lens, and the like. The image sensor 112 may include Ar0231, Imx390, Imx490, and the like. The serializer 113 may include max9295, max96705, and the like. The autonomous driving platform 12 includes a deserializer 121 and an image signal processing (Image Signal Processing, ISP) chip 122. In an example, the deserializer 121 may include Max96721 and the like. The ISP chip 122 may include Hi3559, Hi1951, and the like.

To implement communication between the camera module 11 and the autonomous driving platform 12, the serializer 113 in the camera module 11 and the deserializer 121 in the autonomous driving platform 12 need to be correspondingly configured. As shown in FIG. 2, in a related technology, a procedure in which the serializer 113 and the deserializer 121 are correspondingly configured includes the following five steps:

(1) The camera module 11 access the autonomous driving platform 12.
(2) A user manually adds a configuration file of the camera module 11 in the autonomous driving platform 12.
(3) The autonomous driving platform 12 indicates, based on the configuration file, the camera module 11 to configure the image sensor 112.
(4) The autonomous driving platform 12 indicates, based on the configuration file, the camera module 11 to configure the serializer 113.
(5) The autonomous driving platform 12 configures the deserializer 121.

After the foregoing configuration procedure is completed, the image sensor 112 may convert an optical signal into a multipath parallel electrical signal after sensing the optical signal through the lens 111. The serializer 113 may perform serialization processing on the parallel electrical signal to obtain a serial electrical signal. The camera module 11 sends the serial electrical signal to the autonomous driving platform 12 through the coaxial cable 13. The deserializer 121 of the autonomous driving platform 12 may perform deserialization processing on the received serial electrical signal, to obtain a parallel electrical signal. The parallel electrical signal may be displayed after being processed by the ISP chip 122.

In the foregoing initialization process, the user manually adds the configuration file of the camera module. When a camera module is replaced or a new camera module is introduced, the user needs to manually add a configuration file of the newly added camera module, so that the autonomous driving platform performs adaption on the camera module again, and the autonomous driving platform cannot implement plug and play on the camera module, which reduces user experience.

In a related technology, a correspondence between an ID value of the camera module and the configuration file of the camera module may be further added to the autonomous driving platform. When the camera module accesses the autonomous driving platform, the autonomous driving platform may search for a corresponding configuration file based on the ID value of the camera module, to implement configuration of the camera module. However, in this manner, for a case in which the camera module of the foregoing correspondence is not preconfigured in the autonomous driving platform, automatic adaptation cannot be performed. The user needs to manually add a corresponding configuration file on the autonomous driving platform, and the autonomous driving platform cannot implement plug and play on the camera module, which reduces user experience.

In a related technology, a memory may be further disposed in the camera module. The memory stores a configuration file of the camera module, and the camera module may be configured by invoking the configuration file. However, in this manner, the deserializer of the autonomous driving platform is not correspondingly configured. The autonomous driving platform cannot obtain a video image from the serial electrical signal sent by the camera module. The user still needs to manually add the corresponding configuration file to the autonomous driving platform, and the autonomous driving platform cannot implement plug and play on the camera module, which reduces user experience.

In an embodiment of the present disclosure, a configuration method is provided, which may implement plug and play of an image obtaining device on an image processing device. When the configuration method is applied to the implementation environment of autonomous driving shown in FIG. 1, plug and play of an autonomous driving platform on a camera module may be implemented.

To implement the plug and play of the autonomous driving platform on the camera module, an embodiment of the present disclosure provides a device connection system, which can automatically implement corresponding configuration for a serializer and a deserializer, and implement the plug and play of the autonomous driving platform on the camera module. In this embodiment of the present disclosure, a storage medium configured to store an access configuration file is included in the camera module, and a parsing module that can parse the access configuration file is added to the autonomous driving platform. The parsing module may obtain both a serializer configuration file and a deserializer configuration file based on the access configuration file.

Figure 3:
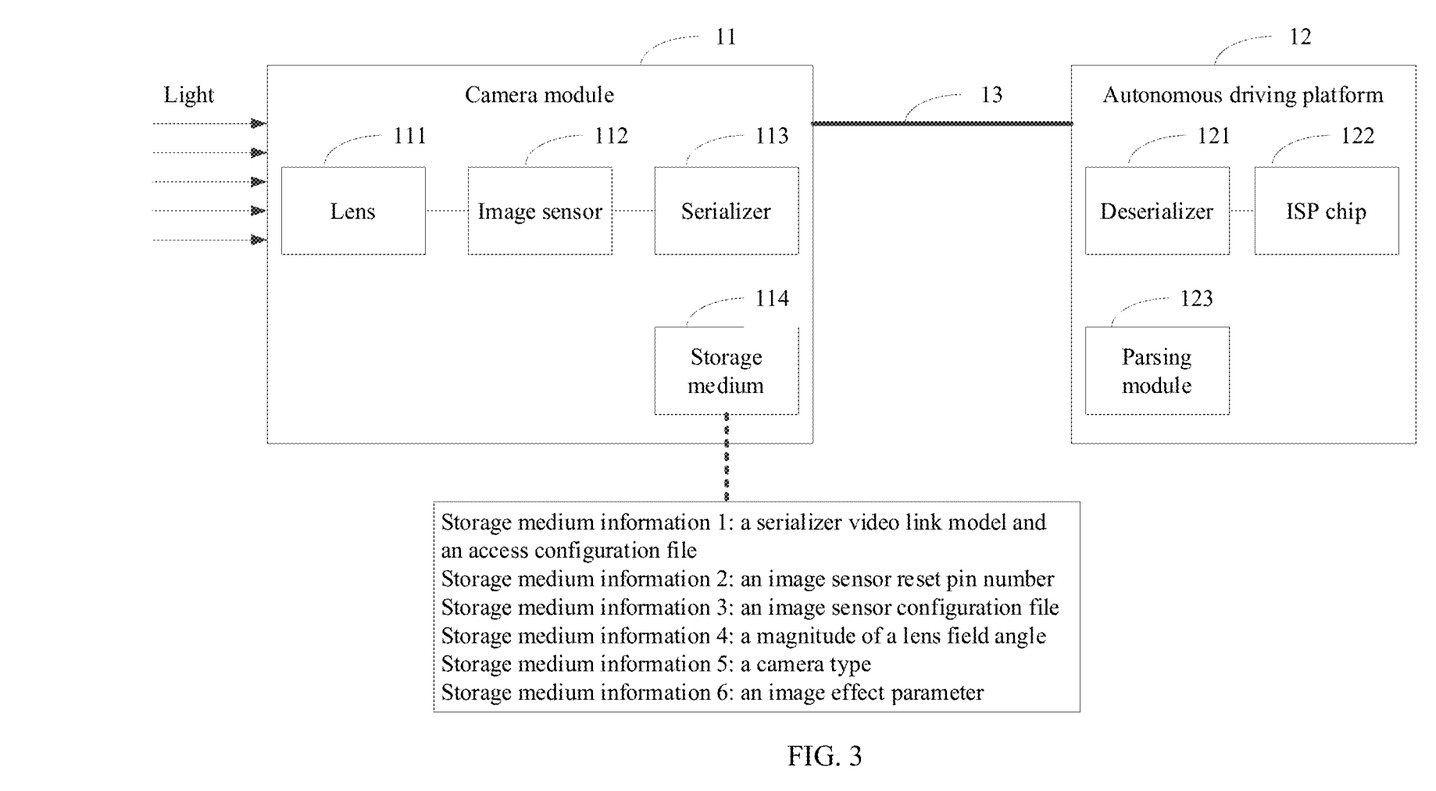
FIG. 3 is a schematic diagram of an architecture of a device connection system according to an embodiment of the present disclosure.

FIG. 3 is a schematic diagram of an architecture of a device connection system according to an embodiment of the present disclosure. As shown in FIG. 3, compared with the device connection system shown in FIG. 2, in the device connection system provided in this embodiment of the present disclosure, a storage medium 114 is added to a camera module 11, and a parsing module 123 is added to an autonomous driving platform 12. The storage medium 114 may store some storage medium information. The parsing module 123 may parse the storage medium information stored in the storage medium 114, to obtain a file used to configure a serializer 113 and a deserializer 121.

The storage medium information stored in the storage medium 114 is shown in FIG. 3. During implementation, functions and meanings of bytes in the storage medium 114 may be first agreed. For example, it is agreed that a first byte represents a pipe channel number, a second byte represents a frame synchronizer (Frame SYNChronizer, FSYNC) pin number, and the like. In this way, the autonomous driving platform 12 may determine, based on an agreement, the meanings of bytes in the storage medium information obtained from the storage medium 114, to parse the storage medium information to obtain information that needs to be used.

In a possible implementation, the storage medium 114 stores storage medium information 1 shown in FIG. 3. After the parsing module 123 parses the obtained storage medium information, the storage medium information 1 can be obtained. To be specific, a video link model of the serializer and an access configuration file can be obtained. The video link model of the serializer includes Max9295, Max96705, Max96707, and the like. The access configuration file includes: transmission channel information (for example, pipe channel information, whose value includes one of X, Y, Z, and U, indicating that which channel of X, Y, Z, and U is used as an image transmission channel), a synchronization pin number (for example, an FSYNC pin number, which represents a pin number used for the serializer to connect to an image sensor in the camera module), information of an address mapping register of a transmission bus (for example, information of an address mapping register of a serializer i2c), link mode information for image transmission (for example, a default GMSL link mode, whose value includes GMSL1 or GMSL2), rate information for image transmission (for example, a default GMSL transmission rate, whose value includes 3G or 6G), format information for image transmission (for example, raw12, raw10, yuv420, or yuv422), and a register initialization configuration list of the serializer.

The foregoing access configuration file can be used to configure the serializer 113 and the deserializer 121. After the parsing module 123 parses out the access configuration file, the autonomous driving platform 12 may obtain, based on the access configuration file, a serializer configuration file used to configure the serializer 113 and a deserializer configuration file used to configure the deserializer 121.

In a possible implementation, the autonomous driving platform 12 may obtain the serializer configuration file based on the format information for image transmission, the information of the address mapping register of the transmission bus, and the rate information for image transmission that are in the access configuration file. The autonomous driving platform 12 may obtain the deserializer configuration file based on an initial configuration file of the deserializer that is preconfigured locally, and the transmission channel information, the synchronization pin number, the rate information for image transmission, and the format information for image transmission that are in the access configuration file. The initial configuration file may represent a general configuration serializer file.

The autonomous driving platform 12 may send a first configuration instruction including the serializer configuration file to the camera module 11. After receiving the first configuration instruction, the camera module 11 may configure the serializer based on the serializer configuration file. After configuration is completed, the serializer may convert a parallel electrical signal obtained by the image sensor into a serial electrical signal for transmission. The autonomous driving platform 12 may configure the deserializer 121 by using an obtained deserializer configuration file. After configuration is completed, the deserializer may perform deserialization processing on the serial electrical signal sent by the camera module 11, to obtain a parallel electrical signal, to restore an image by using an ISP chip for display. In an example, that the autonomous driving platform 12 configures the deserializer 121 may include: configuring a register for receiving a transmission channel, configuring the transmission channel based on the synchronization pin number, configuring a format for receiving the transmission image, and configuring a mipi-related register for communication between the deserializer and the back-end ISP chip.

In a possible implementation, the storage medium 114 further stores storage medium information 2 shown in FIG. 3. After the parsing module 123 parses the obtained storage medium information, the storage medium information 2 can further be obtained, to be specific, an image sensor reset pin number. Then, the autonomous driving platform 12 may send a reset instruction including the image sensor reset pin number to the camera module 11. After receiving the reset instruction, the camera module 11 may perform a reset operation on an image sensor 112.

In a possible implementation, the storage medium 114 further stores storage medium information 3 shown in FIG. 3. After the parsing module 123 parses the obtained storage medium information, the storage medium information 3 can further be obtained, to be specific, an image sensor configuration file. In an example, the image sensor configuration file may include: image sensor resolution, an image register initialization list, an image sensor operation mode (for example, linear, HDR), an image sensor data compression curve, and the like. Then, the autonomous driving platform 12 may send a second configuration instruction including the image sensor configuration file to the camera module 11. After receiving the second configuration instruction, the camera module 11 may configure the image sensor 112.

During implementation, a reset instruction may be sent before the second configuration instruction, so that the image sensor is first reset and then configured.

In a possible implementation, the storage medium 114 further stores storage medium information 4, storage medium information 5, and storage medium information 6 that are shown in FIG. 3. After the parsing module 123 parses the obtained storage medium information, the storage medium information 4, the storage medium information 5, and the storage medium information 6 can be obtained, to be specific, a magnitude of a lens field angle, a camera type (a front view, a rear view, a binocular view, a surround view, and the like), and an image effect parameter (for example, an image quality parameter, an image sensor model, and the like). Then, the autonomous driving platform may perform an image display effect adjustment on the ISP chip 122 based on the foregoing magnitude of the lens field angle, the camera type, and the image effect parameter. In this embodiment of the present disclosure, the magnitude of the lens field angle, the camera type, and the image effect parameter may be referred to as a display effect parameter.

In this embodiment of the present disclosure, when a new camera module is inserted into the autonomous driving platform, the autonomous driving platform may read and parse information stored in a memory medium of the new camera module, to obtain a serializer configuration file and a deserializer configuration file, so that adaptation of the camera module is automatically implemented, and a user does not need to manually modify configuration information on the autonomous driving platform. In other words, in this embodiment of the present disclosure, when a new camera module is introduced to the autonomous driving platform, the autonomous driving platform is insensible to the camera module. Plug and play of the new camera module may be implemented, and compatibility is implemented for different camera modules, so that development efficiency is improved, and development costs are reduced.

Similarly, in this embodiment of the present disclosure, the plug and play may also be implemented for camera modules of different types of image sensors that are newly replaced. The plug and play may also be implemented for upgraded camera modules.

In addition, in this embodiment of the present disclosure, when the new camera module is inserted into the autonomous driving platform, the autonomous driving platform may further read the display effect parameter from the storage medium in the camera module, and then the display effect parameter is transferred to an ISP module for image optimization processing, so that the autonomous driving platform can well adapt to camera modules with different field angles, different camera types, and different image effect parameters.

During implementation, an automatic camera module may be a gigabit multimedia serial link (GMSL) camera, or a non-GMSL camera (for example, a Rohm camera), which is not limited in the present disclosure.

During implementation, the storage medium may be an electrically erasable programmable read-only memory (EE-PROM) and the like, which is not limited in the present disclosure.

During implementation, the autonomous driving platform may include a mobile data center (MDC) and the like, which is not limited in the present disclosure.

Figure 4:
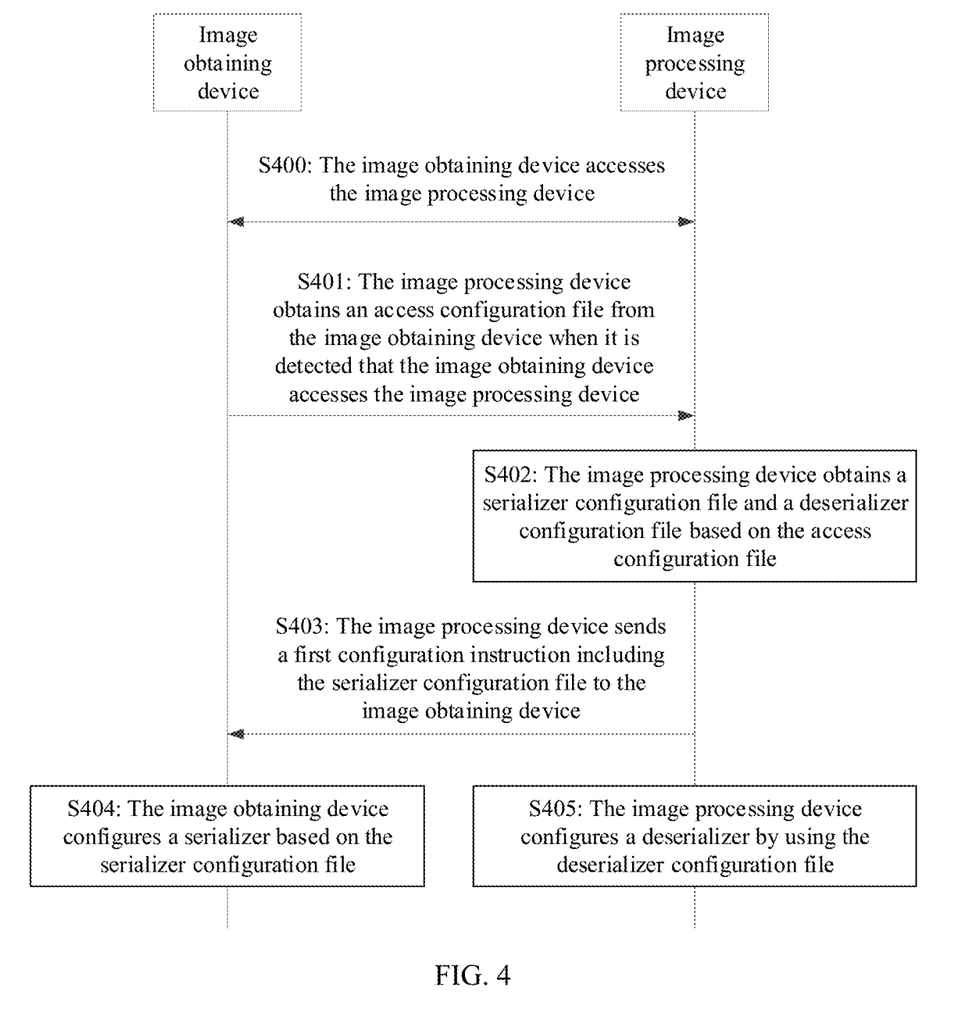
FIG. 4 is an interaction flowchart of a configuration method according to an embodiment of the present disclosure.

FIG. 4 is an interaction flowchart of a configuration method according to an embodiment of the present disclosure. The method may be applied to a device connection system including an image obtaining device and an image processing device. The image obtaining device includes a storage medium, and the storage medium stores an access configuration file. The image processing device includes a parsing module, and the parsing module may parse storage medium information obtained from the storage medium of the image obtaining device, to obtain the access configuration file. In an example, the method shown in FIG. 4 may be applied to the system shown in FIG. 3. As shown in FIG. 4, the method may include steps S400 to S405.

Step S400: The image obtaining device accesses the image processing device.

Step S401: The image processing device obtains the access configuration file from the image obtaining device when it is detected that the image obtaining device accesses the image processing device.

In a possible implementation, the image processing device may send a request for obtaining the access configuration file to the image obtaining device when it is detected that the image obtaining device accesses the image processing device. In response to the request for obtaining the access configuration file, the image obtaining device may return the access configuration file to the image processing device. For the access configuration file, refer to the access configuration file shown in FIG. 3. Details are not described herein again.

Step S402: The image processing device obtains a serializer configuration file and a deserializer configuration file based on the access configuration file.

In a possible implementation, the obtaining a serializer configuration file based on the access configuration file includes: obtaining the serializer configuration file based on format information for image transmission, information of an address mapping register of a transmission bus, and rate information for image transmission that are in the access configuration file. The obtaining a deserializer configuration file based on the access configuration file includes: obtaining the deserializer configuration file based on an initial configuration file of the deserializer that is preconfigured locally, and transmission channel information, a synchronization pin number, the rate information for image transmission, and the format information for image transmission that are in the access configuration file.

For the format information for image transmission, the information of the address mapping register of the transmission bus, the rate information for image transmission, the initial configuration file of the deserializer, and the transmission channel information, the synchronization pin number, and the format information for image transmission that are in the access configuration file, refer to FIG. 3. Details are not described herein again.

Step S403: The image processing device sends a first configuration instruction including the serializer configuration file to the image obtaining device.

The serializer configuration file may be used to configure a serializer that is in the image obtaining device.

Step S404: The image obtaining device configures the serializer based on the serializer configuration file.

Step S405: The image processing device configures a deserializer by using the deserializer configuration file.

In this way, corresponding configuration of the serializer and the deserializer is completed, and the image processing device may process data output by the image obtaining device. In other words, adaptation is completed between the image processing device and the image obtaining device, so that plug and play of the image processing device on the image obtaining device is implemented.

During implementation, the image obtaining device may obtain a parallel electrical signal through an image sensor. The image obtaining device converts the obtained parallel signal into a serial electrical signal through a configured serializer. The image obtaining device sends the serial electrical signal to the image processing device. The image processing device processes the serial electrical signal through a configured deserializer, to obtain a parallel electrical signal. The image processing device displays the obtained parallel electrical signal through an ISP chip.

In this embodiment of the present disclosure, when a new image input device accesses the image processing device, the image processing device may read and parse information stored in a memory medium of the new image input device, to obtain a serializer configuration file and a deserializer configuration file, so that adaptation of the image input device is automatically implemented, and a user does not need to manually modify configuration information in the image processing device. In other words, in this embodiment of the present disclosure, when a new image input device is introduced to the image processing device, the image processing device is insensible to the image input device. Plug and play of the new image input device can be implemented, and compatibility is implemented for different image input devices, so that development efficiency is improved and development costs are reduced.

Figure 5A:
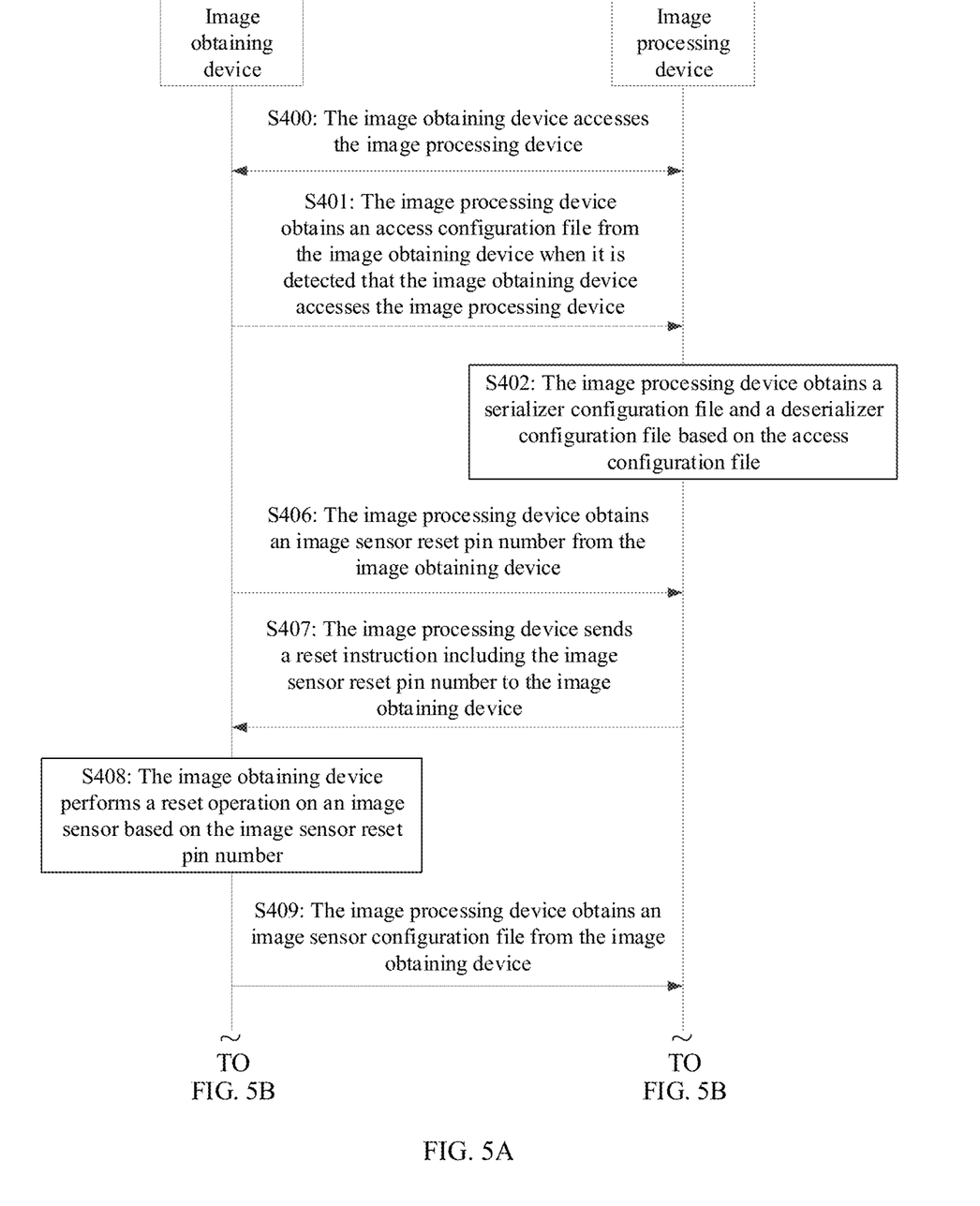
FIG. 5A and FIG. 5B are interaction flowcharts of a configuration method according to an embodiment of the present disclosure.
Figure 5B:
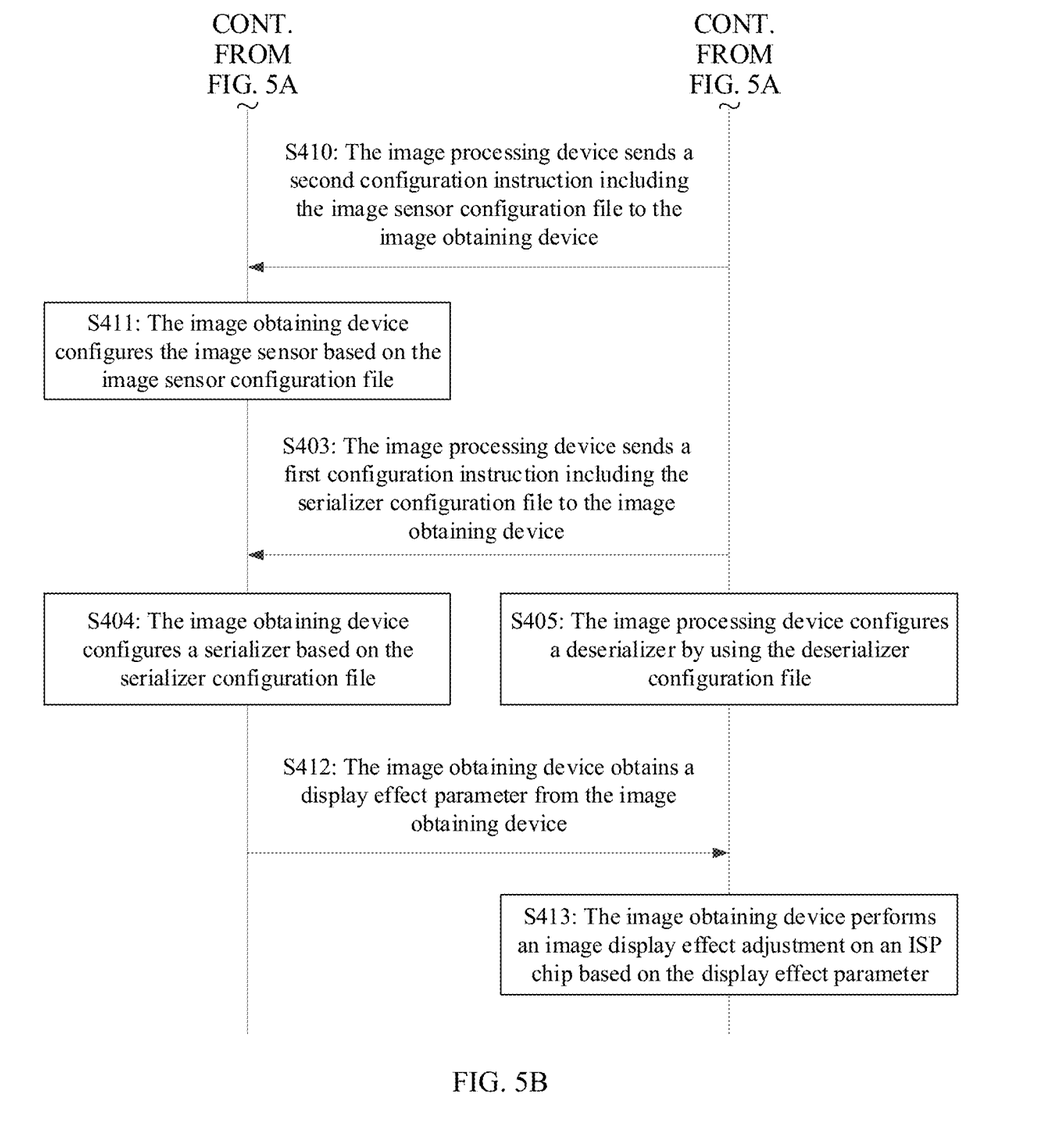

FIG. 5A and FIG. 5B are interaction flowcharts of a configuration method according to an embodiment of the present disclosure. The storage medium of the image obtaining device further includes an image sensor reset pin number, an image sensor configuration file, and a display effect parameter. The parsing module of the image processing device may obtain the foregoing information by parsing. As shown in FIG. 5A and FIG. 5B, based on FIG. 4, the method further includes steps S406 to S413.

Step S406: The image processing device obtains the image sensor reset pin number from the image obtaining device.

For the image sensor reset pin number, refer to FIG. 3. Details are not described herein again.

Step S407: The image processing device sends a reset instruction including the image sensor reset pin number to the image obtaining device.

Step S408: The image obtaining device performs a reset operation on the image sensor based on the image sensor reset pin number.

Step S409: The image processing device obtains the image sensor configuration file from the image obtaining device.

Step S410: The image processing device sends a second configuration instruction including the image sensor configuration file to the image obtaining device.

Step S411: The image obtaining device configures the image sensor based on the image sensor configuration file.

Step S412: The image obtaining device obtains the display effect parameter from the image obtaining device.

Step S413: The image obtaining device performs an image display effect adjustment on the ISP chip based on the display effect parameter.

After the foregoing process, the image sensor is reset and configured, and the ISP chip is configured. In this way, the image obtaining device may obtain the parallel electrical signal through a configured image sensor, and the image processing device displays the obtained parallel signal through an adjusted ISP chip.

It should be noted that an execution sequence of step S401, step S406, step S409, and step S412 is not limited in this embodiment of the present disclosure. After obtaining the storage medium information from the storage medium of the image obtaining device, the image processing device may obtain the access configuration file, the image sensor reset pin number, the image sensor configuration file, and the display effect parameter at a time through parsing. The image processing device may further parse the obtained storage medium information for a plurality of times, to separately obtain the access configuration file, the image sensor reset pin number, the image sensor configuration file, and the display effect parameter. Alternatively, the image processing device may obtain the storage medium information from the storage medium of the image obtaining device for a plurality of times, and separately parse the storage medium information obtained each time, to obtain the access configuration file, the image sensor reset pin number, the image sensor configuration file, and the display effect parameter. In this embodiment of the present disclosure, a manner and a sequence for obtaining the access configuration file, the image sensor reset pin number, the image sensor configuration file, and the display effect parameter are not limited.

In this embodiment of the present disclosure, plug and play may also be implemented for image input devices of different types of image sensors that are newly replaced, and plug and play may also be implemented for an upgraded image input device. When a new image input device is inserted into the image processing device, the image processing device may further read the display effect parameter from the storage medium in the image input device, and then the display effect parameter is transferred to an ISP module for image optimization processing, so that the image processing device can well adapt to image input devices with different field angles, different camera types, and different image effect parameters.

Figure 6:
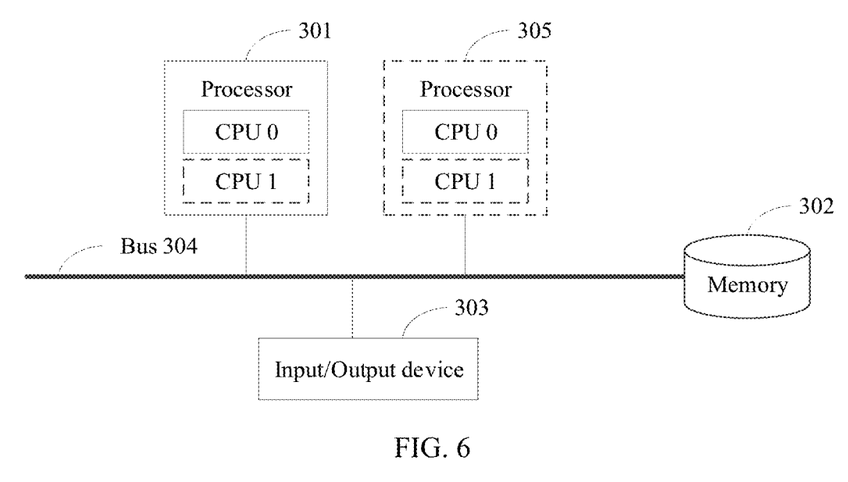
FIG. 6 is a schematic diagram of a structure of a computing device.

FIG. 6 is a schematic diagram of a structure of a computing device. The computing device may be configured to deploy a camera module or an autonomous driving platform.

As shown in FIG. 6, the computing device may include at least one processor 301, a memory 302, an input/output device 303, and a bus 304. Components of the computer device are specifically described in the following with reference to FIG. 6.

The processor 301 is a control center of the computing device, and may be a processor or a collective name of a plurality of processing elements. For example, the processor 301 is a CPU, an application-specific integrated circuit (Application Specific Integrated Circuit, ASIC), or one or more integrated circuits that are configured to implement this embodiment of the present disclosure. For example, one or more microprocessors (Digital Signal Processors, DSPs), or one or more field programmable gate arrays (Field Programmable Gate Arrays, FPGAs).

The processor 301 may execute various functions of the computing device by running or executing a software program stored in the memory 302 and invoking data stored in the memory 302.

During specific implementation, as an embodiment, the processor 301 may include one or more CPUs, for example, a CPU 0 and a CPU 1 shown in the figure.

During specific implementation, as an embodiment, the computing device may include a plurality of processors, for example, the processor 301 and a processor 305 shown in FIG. 6. Each of the processors may be a single-core processor (single-CPU) or a multi-core processor (multi-CPU). The processor herein may be one or more devices, circuits, and/or processing cores configured to process data (for example, computer program instructions).

The memory 302 may be a read-only memory (ROM) or another type of static storage device that can store static information and instructions, a random access memory (RAM) or another type of dynamic storage device that can store information and instructions, or may be an electrically erasable programmable read-only memory (EEPROM), a read-only disc (Compact Disc Read-Only Memory, CD-ROM) or another optical disc storage, an optical disc storage (including a compact disc, a laser disc, an optical disc, a digital versatile disc, a Blue-ray disc, or the like), a magnetic disk storage medium or another magnetic storage device, or any other medium that can be used to carry or store expected program code in a form of an instruction or a data structure and that can be accessed by a computer, but is not limited thereto. The memory 302 may exist independently, and is connected to the processor 301 through the bus 304. The memory 302 may alternatively be integrated with the processor 301. In this embodiment of the present disclosure, the memory 302 may be configured to store an access configuration file, an image sensor reset pin number, an image sensor configuration file, and a display effect parameter.

The input/output device 303 is configured to communicate with another device or a communication network. For example, the Ethernet, a radio access network (RAN), a wireless local area network (WLAN), and other communication networks. The input/output device 303 may include all or a part of a baseband processor, and may alternatively include a radio frequency (RF) processor. The RF processor is configured to send or receive an RF signal. The baseband processor is configured to process a baseband signal converted from an RF signal, or a baseband signal to be converted into an RF signal.

During specific implementation, as an embodiment, the input/output device 303 may include a transmitter and a receiver. The transmitter is configured to send a signal to another device or a communication network, and the receiver is configured to receive a signal sent by the another device or the communication network. The transmitter and the receiver may exist independently, or may be integrated together. In this embodiment of the present disclosure, the input/output device may be configured to receive an image, receive a parallel electrical signal, send a serial electrical signal, and receive a serial electrical signal.

The bus 304 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of indication, the bus is indicated by using only one bold line in FIG. 6. However, it does not indicate that there is only one bus or only one type of bus.

A structure of the device shown in FIG. 6 does not constitute a limitation on the computing device, and may include more or fewer components than those shown in the figure, or combine some components or different components for arrangements.

Figure 7:
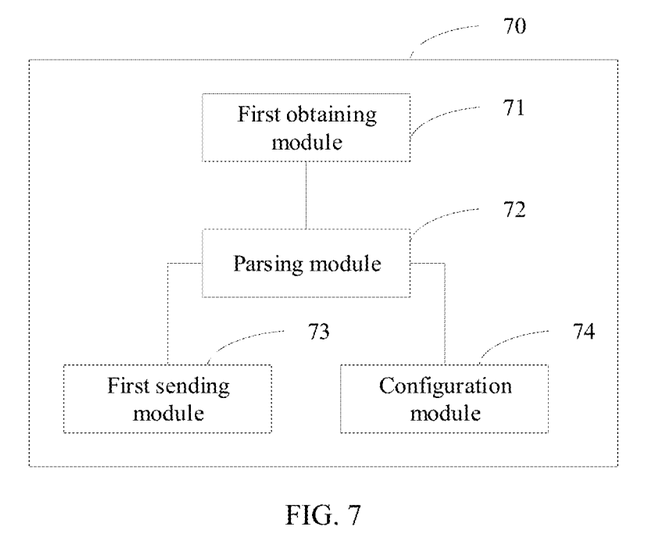
FIG. 7 is a schematic diagram of a structure of a configuration apparatus according to an embodiment of the present disclosure.

FIG. 7 is a schematic diagram of a structure of a configuration apparatus according to an embodiment of the present disclosure. The apparatus may be applied to an image processing device. As shown in FIG. 7, the apparatus 70 includes:
  a first obtaining module 71, configured to obtain an access configuration file from an image obtaining device when it is detected that the image obtaining device accesses the image processing device;
  a parsing module 72, configured to obtain a serializer configuration file and a deserializer configuration file based on the access configuration file obtained by the first obtaining module 71;
  a first sending module 73, configured to send a first configuration instruction to the image obtaining device, where the first configuration instruction includes the serializer configuration file obtained by the parsing module 72, and the serializer configuration file is used to configure a serializer that is in the image obtaining device, so as to enable the image obtaining device to convert an obtained parallel electrical signal into a serial electrical signal for transmission; and
  a configuration module 74, configured to configure a deserializer that is in the image processing device by using the deserializer configuration file obtained by the parsing module 72, to process a serial electrical signal that is from the image obtaining device, so as to obtain a parallel electrical signal that can be displayed on an image signal processing ISP chip.

In a possible implementation, the parsing module includes:
  a first parsing unit, configured to obtain the serializer configuration file based on format information for image transmission, information of an address mapping register of a transmission bus, and rate information for image transmission that are in the access configuration file.

In a possible implementation, the parsing module further includes:
  a second parsing unit, configured to obtain the deserializer configuration file based on an initial configuration file of the deserializer that is preconfigured locally, and transmission channel information, a synchronization pin number, the rate information for image transmission, and the format information for image transmission that are in the access configuration file.

In a possible implementation, the image obtaining device has a storage medium, and the access configuration file is stored in the storage medium.

In a possible implementation, the storage medium further stores an image sensor reset pin number, and the apparatus further includes:

a second obtaining module, configured to obtain the image sensor reset pin number from the image obtaining device; and a second sending module, configured to send a reset instruction to the image obtaining device, where the reset instruction includes the image sensor reset pin number, so as to enable an image sensor in the image obtaining device to perform a reset operation.

In a possible implementation, the storage medium further stores an image sensor configuration file, and the apparatus further includes:

a third obtaining module, configured to obtain the image sensor configuration file from the image obtaining device; and a third sending module, configured to send a second configuration instruction to the image obtaining device, where the second configuration instruction includes the image sensor configuration file, to configure an image sensor in the image obtaining device.

In a possible implementation, the storage medium further stores a display effect parameter, and the apparatus further includes:

a fourth obtaining module, configured to obtain the display effect parameter from the image obtaining device; and an adjustment module, configured to perform an image display effect adjustment on the ISP chip based on the display effect parameter.

In this embodiment of the present disclosure, when a new image input device accesses the image processing device, the image processing device may read and parse information stored in a memory medium of the new image input device, to obtain a serializer configuration file and a deserializer configuration file, so that adaptation of the image input device is automatically implemented, and a user does not need to manually modify configuration information in the image processing device. In other words, in this embodiment of the present disclosure, when a new image input device is introduced to the image processing device, the image processing device is insensible to the image input device. Plug and play of the new image input device can be implemented, and compatibility is implemented for different image input devices, so that development efficiency is improved and development costs are reduced.

An embodiment of the present disclosure provides an electronic device. The electronic device includes a processor and a memory that is configured to store executable instructions that can be executed by the processor, where the processor is configured to implement the foregoing method when executing the instructions.

An embodiment of the present disclosure provides a non-volatile computer-readable storage medium. The non-volatile computer-readable storage medium stores a computer program instruction. When the computer program instruction is executed by a processor, the foregoing method is implemented.

An embodiment of the present disclosure provides a computer program product. The computer program product includes computer-readable code or a non-volatile computer-readable storage medium carrying the computer-readable code. When the computer-readable code runs in a processor of an electronic device, the processor in the electronic device performs the foregoing method.

The computer-readable storage medium may be a tangible device that can retain and store instructions for use by an instruction execution device. The computer-readable storage medium may be (but is not limited to) an electronic storage device, a magnetic storage device, an optical storage device, an electromagnetic storage device, a semiconductor storage device, or any suitable combination of the foregoing. More specific examples (non-exhaustive list) of computer-readable storage media include: portable computer disks, hard disks, random access memory (RAM), read-only memory (ROM), erasable programmable read-only memory (Electrically Programmable Read-Only-Memory, EPROM, or flash memory), static random access memory (SRAM), portable compact disk read-only memory (CD-ROM), digital multi-function disk (Digital Video Disc, DVD), memory sticks, floppy disks, mechanical coding devices, for example, a punching card or a groove protrusion structure that stores an instruction, and any suitable combination thereof.

Computer-readable program instructions or code described herein can be downloaded to respective computing/processing devices from a computer-readable storage medium or to an external computer or external storage device via a Network, such as the Internet, a local area network, a wide area network and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used to perform operations in the present disclosure may be an assembly instruction, an instruction set architecture (Instruction Set Architecture, ISA) instruction, a machine instruction, a machine-related instruction, microcode, a firmware instruction, status setting data, or source code or target code written in any combination of one or more programming languages. The programming languages include an object-oriented programming language such as Smalltalk and C++, and a conventional procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. In a case involving a remote computer, the remote computer may be connected to a user computer through any type of network, including a local area network (LAN) or a wide area network (WAN), or may be connected to an external computer (for example, through the Internet by using an Internet service provider). In some embodiments, an electronic circuit, for example, a programmable logic circuit, a field programmable gate array (FPGA), or a programmable logic array (PLA), is customized by using status information of a computer-readable program instruction. The electronic circuit may execute the computer-readable program instruction, to implement various aspects of the present disclosure.

The various aspects of the present disclosure are described herein with reference to the flowcharts and/or block diagrams of the method, the apparatus (system), and the computer program product according to embodiments of the present disclosure. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/acts specified in the one or more blocks in the flowcharts and/or the block diagrams.

The computer-readable program instructions may alternatively be loaded onto a computer, another programmable data processing apparatus, or another device so that a series of operation steps is performed on the computer, the another programmable data processing apparatus, or the another device to produce a computer-implemented process. Therefore, the instructions executed on the computer, the another programmable data processing apparatus, or the another device implements the functions/acts specified in the one or more blocks in the flowcharts and/or block diagrams.

The flowcharts and block diagrams in the accompanying drawings show the system architecture, function, and operation of possible implementations of apparatus, systems, methods, and computer program products according to various embodiments of the present disclosure. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may, in fact, be executed substantially in parallel, and may sometimes be executed in a reverse order, depending on a function involved.

It should also be noted that each block in the block diagram and/or the flowchart, and a combination of blocks in the block diagram and/or the flowchart may be implemented by hardware (for example, a circuit or an ASIC (Application-Specific Integrated Circuit, application-specific integrated circuit)) that performs a corresponding function or action, or may be implemented by a combination of hardware and software, for example, firmware.

Although the present invention is described with reference to the embodiments, in a process of implementing the present invention that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

The embodiments of the present disclosure are described above. The foregoing descriptions are examples, are not exhaustive, and are not limited to the disclosed embodiments. Many modifications and variations are apparent to a person of ordinary skill in the art without departing from the scope of the described embodiments. Selection of terms used in this specification is intended to best explain embodiment principles, actual application, or improvements to technologies in the market, or to enable another person of ordinary skill in the art to understand the embodiments disclosed in this specification.

What is claimed is:

1. A configuration method for an image processing device, the method comprising:
    obtaining an access configuration file from an image obtaining device based on detecting that the image obtaining device accesses the image processing device;
    obtaining a serializer configuration file and a deserializer configuration file based on the access configuration file;
    sending a first configuration instruction to the image obtaining device, wherein the first configuration instruction comprises the serializer configuration file, and the serializer configuration file is used to configure a serializer that is in the image obtaining device, so as to enable the image obtaining device to convert an obtained parallel electrical signal into a serial electrical signal for transmission; and
    configuring a deserializer that is in the image processing device by using the deserializer configuration file; to process a serial electrical signal that is from the image obtaining device; so as to obtain a parallel electrical signal that can be displayed on an image signal processing (ISP) chip.

2. The method according to claim 1, wherein the obtaining the serializer configuration file based on the access configuration file comprises:
    obtaining the serializer configuration file based on format information for image transmission, information of an address mapping register of a transmission bus, and rate information for image transmission that are in the access configuration file.

3. The method according to claim 1, wherein the obtaining the deserializer configuration file based on the access configuration file comprises:
    obtaining the deserializer configuration file based on an initial configuration file of the deserializer that is preconfigured locally, and transmission channel information, a synchronization pin number, rate information for image transmission, and format information for image transmission that are in the access configuration file.

4. The method according to claim 1, wherein the image obtaining device comprises a storage medium, and the access configuration file is stored in the storage medium.

5. The method according to claim 4, wherein the storage medium further stores an image sensor reset pin number, and the method further comprises:
    obtaining the image sensor reset pin number from the image obtaining device; and
    sending a reset instruction to the image obtaining device, wherein the reset instruction comprises the image sensor reset pin number, so as to enable an image sensor in the image obtaining device to perform a reset operation.

6. The method according to claim 4, wherein the storage medium further stores an image sensor configuration file, and the method further comprises:
    obtaining the image sensor configuration file from the image obtaining device; and
    sending a second configuration instruction to the image obtaining device, wherein the second configuration instruction comprises the image sensor configuration file, to configure an image sensor in the image obtaining device.

7. The method according to claim 4, wherein the storage medium further stores a display effect parameter, and the method further comprises:
obtaining the display effect parameter from the image obtaining device; and
performing an image display effect adjustment on the ISP chip based on the display effect parameter.

8. A configuration apparatus for an image processing device, the configuration apparatus comprises one or more processors and one or more memories, wherein the one or more memories are configured to store instructions, and the one or more processors are configured to execute the instructions to:
obtain an access configuration file from an image obtaining device based on detecting that the image obtaining device accesses the image processing device;
obtain a serializer configuration file and a deserializer configuration file based on the access configuration file;
send a first configuration instruction to the image obtaining device, wherein the first configuration instruction comprises the serializer configuration file, and the serializer configuration file is used to configure a serializer that is in the image obtaining device, so as to enable the image obtaining device to convert an obtained parallel electrical signal into a serial electrical signal for transmission; and
configure a deserializer that is in the image processing device by using the deserializer configuration file, to process a serial electrical signal that is from the image obtaining device, so as to obtain a parallel electrical signal that can be displayed on an image signal processing (ISP) chip.

9. The apparatus according to claim 8, wherein the one or more processors are configured to execute the instructions to:
obtain the serializer configuration file based on format information for image transmission, information of an address mapping register of a transmission bus, and rate information for image transmission that are in the access configuration file.

10. The apparatus according to claim 8, wherein the one or more processors are configured to execute the instructions to:
obtain the deserializer configuration file based on an initial configuration file of the deserializer that is pre-configured locally, and transmission channel information, a synchronization pin number, rate information for image transmission, and format information for image transmission that are in the access configuration file.

11. The apparatus according to claim 8, wherein the image obtaining device comprises a storage medium, and the access configuration file is stored in the storage medium.

12. The apparatus according to claim 11, wherein the storage medium further stores an image sensor reset pin number, and the one or more processors are configured to execute the instructions to:
obtain the image sensor reset pin number from the image obtaining device; and
send a reset instruction to the image obtaining device, wherein the reset instruction comprises the image sensor reset pin number, so as to enable an image sensor in the image obtaining device to perform a reset operation.

13. The apparatus according to claim 11, wherein the storage medium further stores an image sensor configuration file, and one or more processors are configured to execute the instructions to:
obtain the image sensor configuration file from the image obtaining device; and
send a second configuration instruction to the image obtaining device, wherein the second configuration instruction comprises the image sensor configuration file, to configure an image sensor in the image obtaining device.

14. The apparatus according to claim 11, wherein the storage medium further stores a display effect parameter, and the one or more processors are configured to execute the instructions to:
obtain the display effect parameter from the image obtaining device; and
perform an image display effect adjustment on the ISP chip based on the display effect parameter.

15. A vehicle comprising an image processing device and an image obtaining device, wherein the image processing device is configured to:
obtain an access configuration file from the image obtaining device based on detecting that the image obtaining device accesses the image processing device;
obtain a serializer configuration file and a deserializer configuration file based on the access configuration file;
send a first configuration instruction to the image obtaining device, wherein the first configuration instruction comprises the serializer configuration file, and the serializer configuration file is used to configure a serializer that is in the image obtaining device, so as to enable the image obtaining device to convert an obtained parallel electrical signal into a serial electrical signal for transmission; and
configure a deserializer that is in the image processing device by using the deserializer configuration file, to process a serial electrical signal that is from the image obtaining device, so as to obtain a parallel electrical signal that can be displayed on an image signal processing (ISP) chip.

16. The vehicle according to claim 15, wherein the image processing device is configured to:
obtain the serializer configuration file based on format information for image transmission, information of an address mapping register of a transmission bus, and rate information for image transmission that are in the access configuration file.

17. The vehicle according to claim 15, wherein the obtaining the deserializer configuration file based on the access configuration file comprises:
obtaining the deserializer configuration file based on an initial configuration file of the deserializer that is pre-configured locally, and transmission channel information, a synchronization pin number, rate information for image transmission, and format information for image transmission that are in the access configuration file.

18. The vehicle according to claim 15, wherein the image obtaining device comprises a storage medium, and the access configuration file is stored in the storage medium.

19. The vehicle according to claim 18, wherein the storage medium further stores an image sensor reset pin number, and the image processing device is further configured to:
obtain the image sensor reset pin number from the image obtaining device; and
send a reset instruction to the image obtaining device, wherein the reset instruction comprises the image sensor reset pin number, so as to enable an image sensor in the image obtaining device to perform a reset operation.

20. The vehicle according to claim 18 wherein the storage medium further stores an image sensor configuration file, and the image processing device is further configured to:
  obtain the image sensor configuration file from the image obtaining device; and
  send a second configuration instruction to the image obtaining device, wherein the second configuration instruction comprises the image sensor configuration file, to configure an image sensor in the image obtaining device.

* * * * *